United States Patent Office 3,446,670
Patented May 27, 1969

3,446,670
STORAGE BATTERY INCLUDING PASTE OF LEAD OXIDE AND LIGNIN
Carl O. Schilling, Joplin, Mo., assignor to Eagle-Picher Industries, Inc., Cincinnati, Ohio
No Drawing. Filed Nov. 1, 1966, Ser. No. 591,086
Int. Cl. H01m *39/04, 41/00*
U.S. Cl. 136—26           5 Claims

ABSTRACT OF THE DISCLOSURE

Lignin gives improved battery operation when added to lead oxide paste used in the manufacture of positive plates for dry charge storage batteries of the lead acid type. The preferred additive embodiment is a sodium lignosulfonate present in an amount equivalent to about 0.05% to about 0.3% by weight of the lead oxide paste. This additive to the positive plate composition improves the low temperature, i.e., below 32° F., activation characteristics of dry charge storage batteries.

---

This invention relates to the positive plates used in lead-acid type storage batteries. More particularly, this invention relates to improved positive plate compositions for use in dry charge storage batteries of the lead-acid type.

One of the primary changes in battery technology in recent years has been the improvement and widespread commercialization of dry charge storage batteries for consumer use. In the manufacture of such batteries, the positive and negative plates are fully formed in the usual manner, but after formation they are completely dried. After assembly into groups with separators between the plates, the dry elements are sealed in a clean, dry case with no electrolyte present. While the battery is in this dry state, it is substantially inert and not capable of discharging electricity.

The dry charge battery differs from the wet battery in that the former is electrically inactive as produced, and remains so until the acid solution or electrolyte is subsequently added to initiate activation. This is not usually done until the battery is sold at retail. The wet storage battery, on the other hand, is activated during manufacture, and is ready for use at any time thereafter. An important practical advantage of dry charge batteries over wet charge batteries is that the former are safer and easier to ship because they contain no acid solution. Moreover, the dry charge battery has a much longer shelf life because no acid is present to act on the plates until activation occurs.

One serious difficulty previously inherent with dry charge batteries has been their low activation "output," so to speak, immediately after activation at low temperatures. Specifically, the dry charge batteries of the past have been poor at activation in respect to their initial yield when activated at low temperatures, for example, 35° F. or lower. The activation capacity of a battery is a measure of its relative ability to operate at a specified rate of discharge immediately upon addition of the acid electrolyte.

Such low activation capacities have been a problem, because when a new battery is needed by a consumer, the consumer generally wants the battery to operate at or very near peak capacity as soon as it is purchased; the motorist who has a dead battery on a winter morning wants his replacement ready for service as soon as it is installed. However, at low temperatures a dry charge battery with a low activation capacity may not permit the motorist to start his automobile at once because the initial output of the battery just after activation does not meet the power requirements needed to start the engine.

Thus, temperatures below about 35° F. cause operational problems in dry charge batteries which are most acute during a critical period of battery use, namely, immediately after purchase when full power is often desired. These defects do not arise in activation at relatively warm temperatures, for example, at 80° F. or above, as currently produced dry charge storage batteries activate satisfactorily at such temperatures almost as soon as they are filled with acid solution. But at low temperatures a waiting period is often necessitated after filling to permit the battery to become sufficiently activated to produce a standard cranking voltage output. Depending on the ambient temperature, the waiting period may vary anywhere from one-half hour to over twenty-four hours. As a general rule, activation capacities upon the filling of normal dry charge batteries approach zero as the temperature approaches 0° F.

Table I below sets forth comparative activation data for typical, modern day dry storage batteries which do not incorporate the principles of this invention. The percentage figures represent the percent of the batteries' normal or rated capacity at varying periods of time subsequent to activation or filling of the battery with electrolyte. The batteries were tested at a discharge rate of 300 amperes.

TABLE I.—RELATIVE CAPACITY OF DRY CHARGE STORAGE BATTERIES AS A FUNCTION OF TEMPERATURE

| Hours stand after filling. | 1/10 hour, percent | 6 hours, percent | 24 hours, percent |
|---|---|---|---|
| Ambient temperature: | | | |
| 80° F | 92 | 103 | 100 |
| 32° F | 18 | 62 | 78 |
| 0° F | 8 | 19 | 25.7 |

Thus, it may readily be seen that for dry charge batteries, as a general rule, the activation capacity drastically decreases with decreasing ambient temperatures.

To increase the low initial capacity of prior art batteries it has often been necessary to warm up the acid solution and the battery or both, for example, to approximately 70 or 80° F., prior to pouring the acid into the battery cells. Such heating is obviously inconvenient, expensive, and time consuming. Alternatively, the cold, freshly filled battery can be given a booster charge, but again, this is merely a cure and not a prevention. Other than these methods, the only other alternative has been to permit the filled battery to sit for a substantial period upon filling, for example, twenty-four hours, so that it may build up a satisfactory capacity.

It has been the widespread belief that the cause of these defects lay in the negative battery plates, and previous attempts to increase the low temperature activation capacity of dry charge batteries have been primarily directed at improving the negative plates. The reason for this belief has been that battery failure always occurs first at the negative plates. A great many materials have been tested as additives in attempts to successfully combat the problem associated with low temperature activation, but the additives used in wet storage batteries to enable them to operate satisfactorily at low temperatures do not produce the desired effect when employed in the plates of dry charge storage batteries, and, so far as I am aware, no previous attempt to solve the problem in dry charge batteries has been successful. Since any given dry charge battery may be sent to and used virtually anywhere in the world, all climates may be encountered in its operation and a solution to the problem of cold weather activation has been needed.

I have found that, contrary to past beliefs, the problem is not in the negative plates, but with the positive plates. The substance of this invention is predicated upon the discovery that the addition of lignin to the positive plates of dry charge storage batteries of the lead-acid type geratly improves their low temperature activation characteristics.

Lignin occurs in nature in woody material where it appears to be associated with the incrusting substance in which cellulose fibers are imbedded. Any process involving the separation of cellulosic from non-cellulosic substances in woody material can be made a source of some form of lignin. Thus, lignin is contained in the waste liquors of the sulfite, soda, and sulfate processes for pulping wood, and in the solid residues of wood saccharification processes. The lignin recoverable from such wastes and residues varies in composition and properties, the physical and chemical parameters being dependent not only on the process employed but also on the kind of wood used. In the terminolgy of the industry, so-called "crude" lignins are those which have received only a limited amount or no chemical purification, while "refined" lignins have been subjected to chemical treatment under strict conditions of quality control so that the resulting lignin product does not substantially vary in chemical composition.

In accordance with this invention, lignin, preferably refined lignin, is dispersed in the positive plates of dry charge batteries to increase their activation capacities at low temperatures. Typical examples of suitable commercially available types of lignins are: (a) sodium lignosulfonate such as Polyfon F, manufactured by West Virginia Pulp & Paper Co.; (b) sodium salt of pine wood lignin such as Indulin C, manufactured by West Virginia Pulp & Paper Co.; (c) partially desulfonated sodium lignosulfonate such as Maracell E, manufactured by Marathon Corp.; (d) calcium and manganese free lignosulfonic acid such as Maracell C, manufactured by Marathon Corp.; (e) calciium lignosulfonate such as Norlig A, manufactured by Marathon Corp. The lignin preferred for use in this invention is a sodium lignosulfonate such as Polyfon F, the use of which effects surprisingly high capacities, as shown hereinafter.

It is desirable that the lignins be mixed into the positive plate lead oxide paste in an amount between about .025 and 1.0% by weight of the paste. Proportions of about 0.05–0.3% are preferred. If amounts smaller than 0.025% are added, the performance level of the battery is usually not increased to an acceptable level. Larger amounts than 1% do not produce commensurately better performance and may be deleterious.

The positive plates of dry charge storage batteries of the lead-acid type may be formed in any of the known configurations or constructions, the construction used being dependent upon the type of service required, etc. The most familiar type of battery construction, for example, the type used in automobile batteries, has the active material of the positive plates based or pasted on a ladder-like grid. Typically, a paste mix of lead oxide, acid, and water is prepared and worked onto the positive plate grid. Thereafter the newly formed grid is washed in fresh water to eliminate residual free acid that may be present on the plates. Subsequently, the positive plates are formed and dried, for example by introducing the plates into an oven environment where they are subjected to super-heated steam.

In carrying out the principles of this invention, the lignin may be incorporated or added to the positive plate in different ways. For example, the lignin may be added as a powder to the grid plate mix when the mix is in the paste form. Alternatively, the lignin can be added to the mix as a liquid. It is preferred that the lignin and lead oxide be mixed while both are in the powder form, for the reason that mixing of the lead oxide and lignin with both in powder form gives a material which is stable for an extended period.

The invention is further illustrated by means of the following examples.

The data in Tables II and III illustrate the improvement in activation characteristics of a dry charge storage battery having a refined lignin additive in the positive plates, according to this invention, as opposed to a dry charge battery otherwise similar but having no lignin additive in the positive plates. The batteries were tested at a discharge rate of 300 amperes and the amount of the refined lignin additive used was .11% by weight in both Tables II and III.

TABLE II.—YIELD OF DRY CHARGE STORAGE BATTERIES AT 0° F.

|  | No lignins in positive plates | | | Polyfon F in positive plates |
| --- | --- | --- | --- | --- |
| Hours stand after filling | .1 | .5 | 24 | .33 |
| Cell voltage (5 seconds after start of discharge) | 0.90 | 1.42 | 1.48 | 1.12 |
| Yield, minutes for drop to 1 volt/cell | 0.00 | 0.22 | 1.03 | 1.00 |
| Yield, percent of rated capacity | 0 | 5.5 | 25.7 | 25.0 |

The dry charge batteries used in obtaining the data for Table II were cooled to 0° F., filled with 0° F. electrolyte, stored for the required time interval at 0° F., and tested at 0° F.

TABLE III.—YIELD OF DRY CHARGE BATTERIES AT 32° F.

|  | No lignins in positive plates | | | Polyfon F in positive plates |
| --- | --- | --- | --- | --- |
| Hours stand after filling | 0.1 | 0.5 | 24 | 0.33 |
| Cell voltage (5 seconds after start of discharge) | 1.45 | 1.56 | 1.64 | 1.48 |
| Yield, minutes for drop to 1 volt/cell | 0.9 | 1.4 | 3.9 | 4.2 |
| Yield, percent of rated capacity | 18 | 28 | 74 | 84 |

The dry charge batteries used in obtaining the data for Table III were cooled, filled, stored, and tested at a constant temperature of 32° F.

Thus, it may be seen that, at both 0° F. and 32° F., the batteries having the lignin additive in the positive plates were operable, within 20 minutes after filling, at substantially the same or better discharge rates than batteries with no lignins in the positive plates after 24 hours standing.

Table IV illustrates the use of various other refined lignins, in varying amounts, in positive plates of dry charge batteries. In each case, the battery was cooled to 30° F., filled with 30° F. electrolyte, stored for 20 minutes at 30° F., and tested at 30° F. The batteries were discharged at a rate of 150 amperes.

TABLE IV.—YIELD OF DRY CHARGE STORAGE BATTERIES

| Lignin by trade Name | Amount in positive plates, percent by weight | Cell voltage (5 seconds after start of discharge) | Minutes Run |
| --- | --- | --- | --- |
| None |  | 8.20 | 2.2 |
| Norlig A | 0.11 | 9.20 | 3.1 |
| Maracell C | 0.11 | 9.20 | 3.9 |
| Maracell E | 0.11 | 9.25 | 3.2 |
| Indulin C | 0.0275 | 8.75 | 4.0 |
| Polyfon F | 0.055 | 9.20 | 4.2 |
| Do | 0.11 | 9.25 | 4.65 |
| Do | 0.22 | 9.25 | 3.8 |

Although the invention has been described with particular reference to certain preferred embodiments thereof, variations and modifications may be made within the spirit of the invention by those skilled in the art without departing from the scope thereof, as defined in the appended claims.

What I desire to claim and protect by Letters Patent is:

1. A dry charge storage battery of the lead acid type having positive and negative plates, said positive plate having a lead oxide paste as an electrically active component thereof, wherein the improvement comprises about 0.025–1.0% of lignin dispersed in said lead oxide paste.

2. The battery of claim 1 wherein said lignin is a refined lignin.

3. The battery as set forth in claim 2 wherein said refined lignin is a sulfonated lignin.

4. The battery as set forth in claim 2 wherein said refined lignin is a sodium lignosulfonate.

5. The battery as set forth in claim 2 wherein said refined lignin is present in an amount equivalent to about 0.05 to about 0.3 percent by weight of said lead oxide paste.

References Cited

UNITED STATES PATENTS

| | | | |
|---|---|---|---|
| 2,242,601 | 5/1941 | Wallace | 136—26.7 |
| 2,345,035 | 3/1944 | Daily et al. | 136—26.6 |
| 2,365,600 | 12/1944 | Schorger | 136—26.6 |
| 2,371,136 | 3/1945 | Harmon | 136—26.7 |
| 2,371,137 | 3/1945 | Orsino et al. | 136—26.6 |
| 2,389,465 | 11/1945 | Stewart et al. | 136—26.6 |
| 2,389,832 | 11/1945 | Williams et al. | 136—26 |
| 2,674,594 | 4/1954 | Lewis et al. | 136—65 |
| 2,692,904 | 10/1954 | Strauss | 136—49 |

ALLEN B. CURTIS, *Primary Examiner.*

C. F. Le FEVOUR, *Assistant Examiner.*

U.S. Cl. X.R.

136—27